(12) United States Patent
Kozak et al.

(10) Patent No.: US 9,100,591 B2
(45) Date of Patent: Aug. 4, 2015

(54) SYSTEMS AND METHODS OF MANAGING METAMERIC EFFECTS IN NARROWBAND PRIMARY DISPLAY SYSTEMS

(75) Inventors: Eric Kozak, Burnaby (CA); Scott Daly, Kalama, WA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 447 days.

(21) Appl. No.: 13/493,663

(22) Filed: Jun. 11, 2012

(65) Prior Publication Data

US 2013/0016142 A1  Jan. 17, 2013

Related U.S. Application Data

(60) Provisional application No. 61/506,549, filed on Jul. 11, 2011.

(51) Int. Cl.
| | |
|---|---|
| *G09G 3/34* | (2006.01) |
| *H04N 9/31* | (2006.01) |
| *G03B 21/20* | (2006.01) |
| *G03B 33/06* | (2006.01) |
| *G09G 3/00* | (2006.01) |

(52) U.S. Cl.
CPC .......... *H04N 9/3158* (2013.01); *G03B 21/2033* (2013.01); *G03B 33/06* (2013.01); *G09G 3/001* (2013.01); *G09G 3/34* (2013.01); *H04N 9/3164* (2013.01); *H04N 9/3182* (2013.01)

(58) Field of Classification Search
None
See application file for complete search history.

(56) References Cited

U.S. PATENT DOCUMENTS

| | | | | |
|---|---|---|---|---|
| 6,259,430 | B1 * | 7/2001 | Riddle et al. | 345/589 |
| 6,975,294 | B2 * | 12/2005 | Manni et al. | 345/83 |
| 7,866,869 | B2 | 1/2011 | Karakawa | |
| 2005/0110703 | A1 * | 5/2005 | Riddle et al. | 345/32 |
| 2007/0132680 | A1 * | 6/2007 | Kagawa et al. | 345/84 |
| 2009/0201309 | A1 | 8/2009 | Demos | |
| 2013/0010820 | A1 * | 1/2013 | Curtis | 372/23 |

FOREIGN PATENT DOCUMENTS

| | | |
|---|---|---|
| CN | 1410784 | 4/2003 |
| WO | 2010/085505 | 7/2010 |

OTHER PUBLICATIONS

Brill, M.H., et al., "Avoiding on-Screen Metamerism in N-Primary Displays" Journal of the Society for Information Display, vol. 13, Issue 6, Article first published online Jun. 18, 2012.
Brill, M.H., et al., "Invited paper: Color-Matching Issues in Multi-Primary Displays" Proc. 2nd Americas Display Engineering and Applications Conference, 119-122, 2005.
Sarkar, A., et al., "Toward Reducing Observer Metamerism in Industrial Applications: Colorimetric Observer Categories and Observer Classification" published in Eighteenth Color and Imaging Conference: Color Science and Engineering Systems, Technologies, and Applications, San Antonio, Texas, Nov. 2010, p. 307-313.

(Continued)

Primary Examiner — Joseph Haley

(57) ABSTRACT

Several embodiments of display systems that use narrowband emitters are disclosed herein. In one embodiment, a display system comprises, for at least one primary color, a plurality of narrowband emitters distributed around the primary color point. The plurality of narrowband emitters provides a more regular power vs. spectral distribution in a desired band of frequencies.

20 Claims, 8 Drawing Sheets

(56) References Cited

OTHER PUBLICATIONS

Bergquist, Johan, "52.2: Display with Arbitrary Primary Spectra" SID Symposium Digest of Technical Papers, vol. 39, Issue 1, pp. 783-786, May 2008.

Fairchild, M.D., et al., "Mean Observer Metamerism and the Selection of Display Primaries", 15th Color Imaging Conference, published in 2007.

* cited by examiner

SYSTEMS AND METHODS OF MANAGING METAMERIC EFFECTS IN NARROWBAND PRIMARY DISPLAY SYSTEMS

CROSS REFERENCE TO RELATED APPLICATIONS

This Application claims the benefit of priority to related, co-pending Provisional U.S. patent application No. 61/506,549 filed on 11 Jul. 2011 entitled "Systems and Methods of Managing Metameric Effects in Narrowband Primary Display Systems" by Eric Kozak, et al. hereby incorporated by reference in its entirety.

TECHNICAL FIELD

The present invention relates to displays systems and, more particularly, display systems—including projector systems and direct view systems or others—that may employ narrowband lighting.

BACKGROUND

Typically, display systems generate images from three or more primary colors. Some light sources (e.g. LED, OLED, laser especially) can only produce a narrow range of wavelength. Each primary will be emitted from a separate source (or group of sources). The light from all the sources in the system can be mixed in varying quantities to generate any color within the gamut of the primaries (e.g., by using Grassman's Law of Additivity).

Characteristically, lasers and LEDs/OLEDs have a very narrow spectrum around a center frequency (or inversely, the wavelength), so the colored light that is produced contains only substantially a very exact color.

Human beings all view color slightly differently, i.e. different people are more sensitive to certain hues of reds, greens, and blues. Humans can be thought to have color filters embedded in their eyes which yellow slightly with age. Thus, when two observers look at an identical very specific hue of red (or other color) they may report different intensities relative to other colors observed in the ambient environment.

This effect may be compounded by colors generated by narrow spectrum sources. With a display system comprised of narrow band primaries, two observers may perceive different projected colors due to slight variances in cone wavelength sensitivity. This effect is often referred to as "metameric failure", and may not be desirable by the designers of display systems comprising narrow spectrum sources.

SUMMARY

Several embodiments of display systems and methods of their manufacture and use are herein disclosed. Such display systems may encompass all manners of displays—e.g. projector systems, direct view systems and the like.

In one embodiment, a projector system is disclosed, designed to emit light from a plurality of primary colors. For at least one such primary color, the projector system further comprises a plurality of narrowband emitters grouped approximately around a single wavelength or frequency of such primary color. The plurality of narrowband emitters are intentionally selected to provide, collectively, a slightly wider band of wavelengths or frequencies than might be achieved by random selection of emitters around the same primary color.

In yet another embodiment, a direct view display is disclosed, designed to emit light from a plurality of primary colors. For at least one such primary color, the projector system further comprises a plurality of narrowband emitters grouped approximately around a single wavelength or frequency of such primary color. The plurality of narrowband emitters are intentionally selected to provide, collectively, a slightly wider band of wavelengths or frequencies than might be achieved by random selection of emitters around the same primary color.

In yet another embodiment, a display system comprising a plurality of narrowband emitters, intentionally selected as noted, may be employed by turning on a selected subset of the plurality when colors in an image are displayed that are near the edge of the color gamut of the display system.

Other features and advantages of the present system are presented below in the Detailed Description when read in connection with the drawings presented within this application.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

DETAILED DESCRIPTION

Throughout the following description, specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One Embodiment-Projector Systems

Figure 1A:
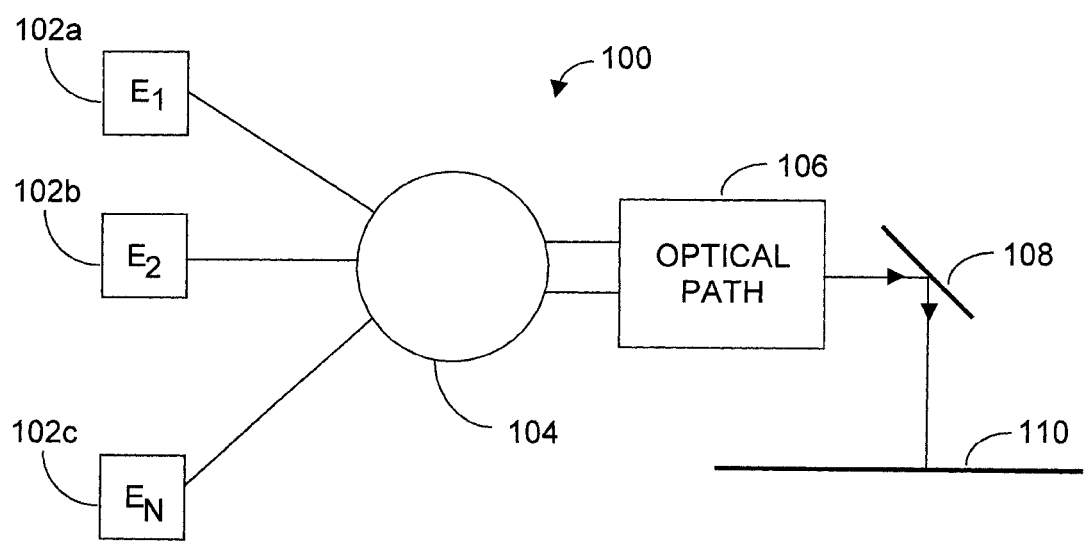
FIGS. 1A and 1B show two alternative embodiments of a projector system that employs a plurality of narrowband emitters to provide at least one primary color.

FIG. 1A shows one embodiment of a projector system 100 that comprises a plurality of narrowband (NB) emitters (102*a*, 102*b*, 102*c*) that are grouped around at least one primary color. Projector system 100 may have many primary colors that are employed to provide a full color gamut to the viewer—and it may be desirable for the projector system to have pluralities of narrowband emitters, as intentionally selected as described herein, for each primary color designed into the projector system—but, for purposes of the present application, it may be sufficient that there is only one primary color for which there is a plurality of narrowband emitters that are intentionally selected.

There may be several reason why a projector system designer might use a plurality of emitters around a given primarily—e.g. to increase the luminance of the projected image for a satisfying visual experience in, say, a movie theatre. For example, modern display systems have the added demand of increased luminance due to the proliferation of 3D movies (glasses attenuate light), larger screens (reduces average light in an area), and the desire for more stunning on-screen images. Laser projectors may employ multiple lasers for each primary to economically increase the amount of light output by the projector and thus brighten the projected image.

In the case of laser projector systems, another reason might be to reduce the effect of speckling that may be attendant with laser produced light. In the case of LED backlit displays, there are often a great many LEDs spatially distributed representing each primary.

Assuming each emitter 102*a*, 102*b* and 102*c* emit substantially around a single primary color (and its characteristic wavelength or frequency) and assuming that there may be other emitters (not shown) that emit light for other primary colors designed into the projector system, the light from each of these emitter may be combined into an optical path, perhaps by an optional integrating sphere 104 and sent into an optical path 106 which may comprise any number of lenses or other optical elements (not shown), according to the dictates of the system designers. As may be designed into a projector system, the light may be sent to a set of DLP reflectors 108 and subsequently displayed on a screen 110—to present an image to set of viewers in a variety of settings, for example, a movie theatre, home projector system or the like.

It will be appreciated that many different types of projector systems may be designed, employing a plurality of narrowband emitters for at least one primary color—and that the scope of the present application is not limited by the recitation of one such projector systems. In fact, other suitable projector systems may be rear projector, front projection or the like.

Figure 1B:
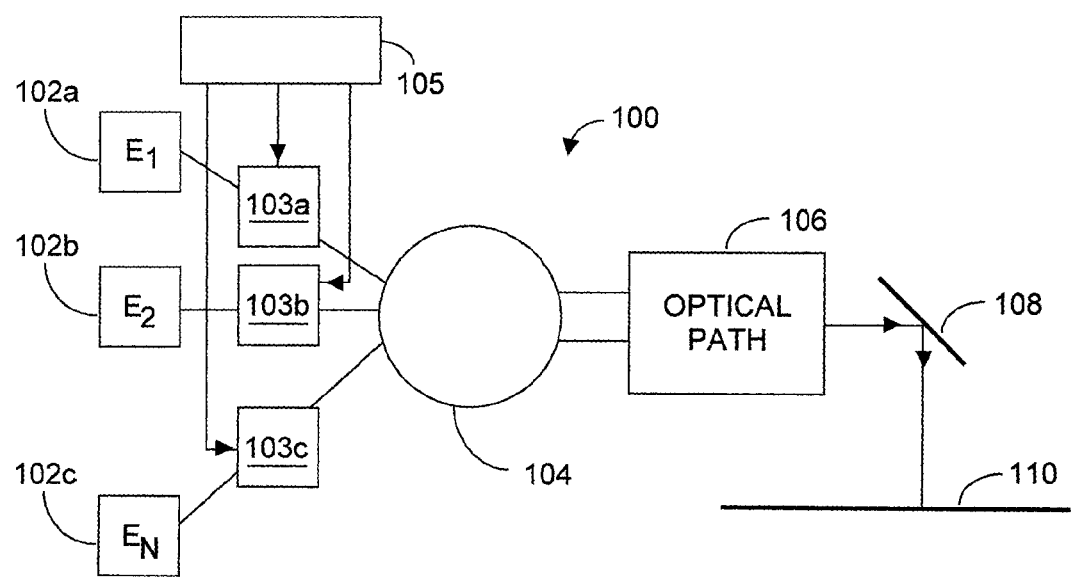

FIG. 1B shows another alternative embodiment of a projector system 100 as shown in FIG. 1A. In this embodiment, liquid crystal resonator cavity (LC cavity) 103*a*, 103*b*, 103*c* are placed in the path of light emanating from narrowband emitters 102*a*, 102*b* and 102*c* and arriving at integrating sphere 104. Controller 105 is shown, sending control signals (e.g. voltage signals) to each such LC cavity. As is known, LC cavities have certain characteristics such as polarization change which in turn can shift laser wavelengths as a function of applied voltage. Controller 105 may also comprise suitable hardware, firmware and/or software to allow for the calibration of the display system. In addition, controller 105 may contain suitable hardware, firmware and/or software to determine image data content and characteristics—e.g. chromaticity, color saturation, luminance, etc.

As discussed further below, such wavelength modulations may allow the designer of the projector system to have control over a number of variables for image rendering. For example, the frequencies of the light from the NB emitters may be modulated by the LC cavities to have more accurate, and even spectral spacing between each other. In addition, LC cavity modulation may dynamically alter the spacing of the NB emitter light to control the bandwidth of the light collectively from the plurality of NB emitters.

As shown in FIG. 1B, the LC cavities may have separate voltages applied to them which is controlled either by a calibration system or by a display rendering algorithm. For the calibration system approach, the center wavelengths of the installed emitters may be measured, and voltages are then applied in a fixed manner in order to spread out the emitter wavelengths according to the goal of minimizing metamerism.

When under control of the display rendering algorithm, the voltages are determined based on the image content. If there is not a substantial amount of highly saturated content, then the voltages may be set to spread the center wavelengths apart to reduce metamerism. Conversely, if there is substantially little or no desaturated content, then the voltages may be applied such that they are shifted to be as close together as possible. As will be discussed further with regards to FIG. 6 below, this may enable a wider color gamut, and if there are no desaturated colors, the metamerism problem is less noticeable due to the Human Visual System (HVS) having elevated thresholds for distortion for saturated colors.

Although FIG. 1B discloses one embodiment for the tuning of light frequencies and/or wavelengths (i.e. LC cavities) in order to control the spacing of the narrowband emitters (either for calibration or image rendering), it will be appreciated that there are several other known apparatus and techniques for tuning the wavelengths of such narrowband emitters. For example, the techniques of Optical Parametric Oscillation (OPO), the use of non-linear crystals, piezoelectric crystal oscillators, and the use of dye-tunable lasers are all suitable apparatus and methods of tuning the light of narrowband emitters for the purposes of the present application. The scope of the present application encompasses all of the above and other known apparatus and methods. Broadly, these known techniques may be referred to a "wavelength tuners" for the purpose of the present application.

Figure 2A:
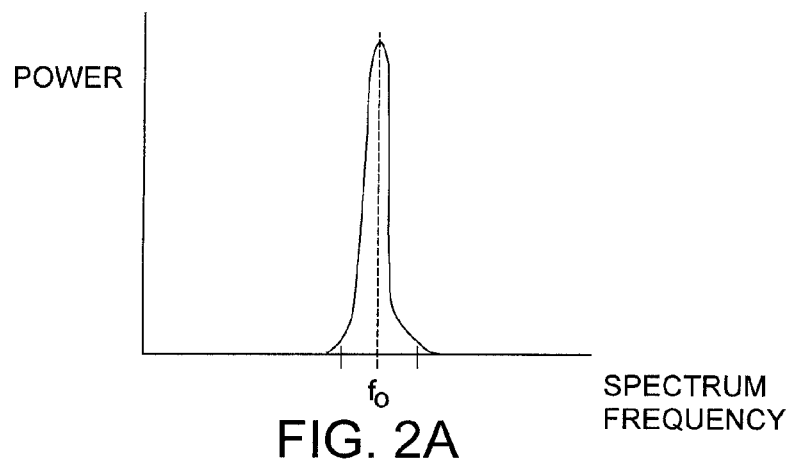
FIG. 2A depicts a power vs. spectrum frequency distribution for one exemplary narrowband emitter.

FIG. 2A shows a mapping of power vs. spectral frequency for a single narrowband emitter, such as a laser, LED, or OLED emitter. As may be seen, the power is sharply peaked at substantially a single frequency, $f_0$. In the case of lasers, current laser fabrication techniques and operating conditions yield lasers that have their center frequencies differing from an ideal frequency within a tolerance range, i.e. all lasers are not exactly the same, but they all fall within a statistically predictable group. Thus, when several lasers of one color are grouped together, they will have a random distribution of beam centers generating a non-uniform spectrum. The same may be substantially said of LED and OLED emitters.

Figure 2B:
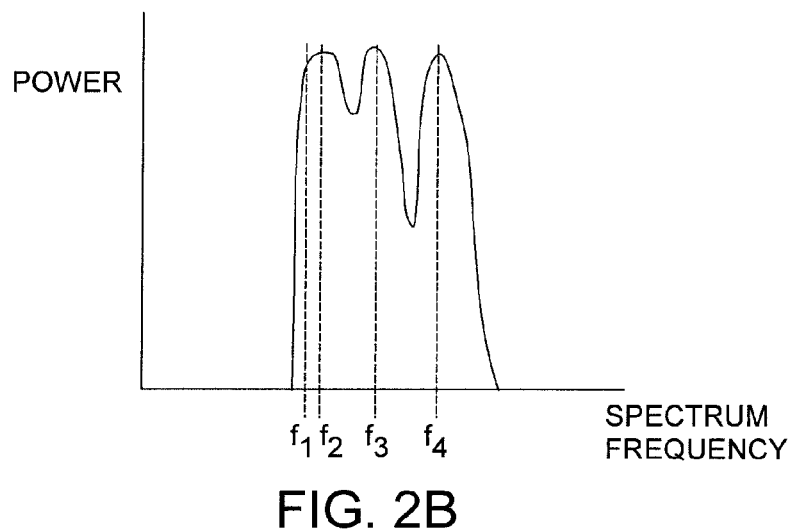
FIG. 2B depicts the power vs. spectrum frequency distribution for a substantially random collection of narrowband emitters, centered about a primary color.

FIG. 2B shows a mapping of power vs. spectral frequency for a plurality of single narrowband emitters, each emitter constructed to conform to a single primary (e.g. red at 650 nm wavelength). Each emitter may have slight variation from 650 nm—with the resulting power vs. spectral frequency mapping to be irregular (as shown) and with a slightly larger band than a single narrowband spread.

Figure 3:
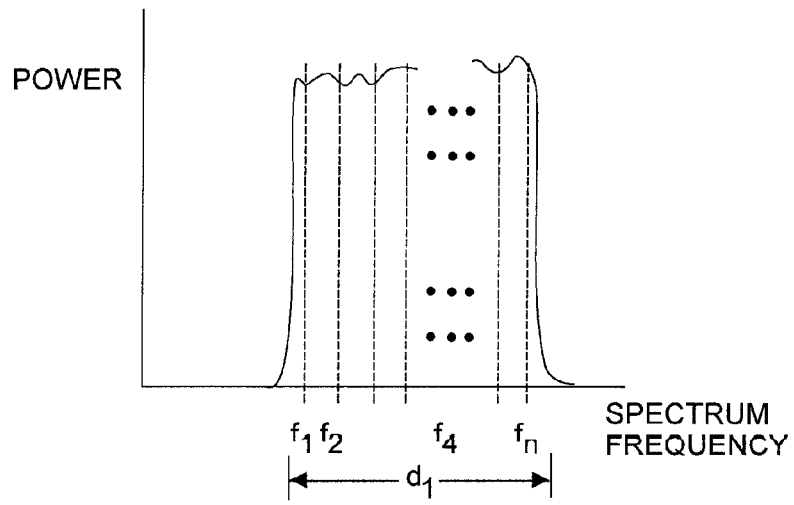
FIG. 3 shows the power vs. spectrum frequency distribution for a plurality of narrowband emitters that are substantially equally distributed about one primary color and with sufficient number so as to achieve a desired band of frequencies about the primary color.

If the plurality of single narrowband emitters is intentionally chosen, then a wider and more even and/or regular band of emission may be affected. FIG. 3 shows a plurality of intentionally chosen narrowband emitters (say, $\{e_1, e_2, \ldots e_n\}$ emitting at center frequencies ($f_0, f_1, \ldots, f_n$) for example)—in this embodiment, each emitter may be substantially evenly spaced and given in a sufficient number to provide a substantially even power distribution across a desired band of spectrum presented. In one embodiment, each adjacent pair of emitters {$e_i$, $e_j$} may have substantially the same spectral distance when compared to any other adjacent pair of emitters.

In another embodiment, the number of emitters may be determined by the spectral distance of the band, $d_1$, divided by the substantially regular spacing of the emitters. For merely exemplary embodiments, spectral width or distance, $d_1$, might comprise a range of 18-33 nm. Other embodiments may have different spectral widths for different primary colors—e.g. 18 nm for red, 25 nm for blue and 33 nm for green. These widths may vary, depending upon the amount of metamerism might be presented by these (and other) primary colors. In addition, the width may be dependent upon the type of application for the given display system—e.g. a laser projector for cinema, a laser projector or LED direct view for home, etc.

Employing such a plurality of narrowband emitters allows for a broader spectrum for each primary color generation. Due to the broader spectrum, observers with slightly different cone sensitivities may not disagree on perceived colors from the projection system, thus avoiding metameric failure.

In one embodiment, these pluralities of narrowband emitters may be selected in a production facility by use of effective binning techniques (e.g. testing fabricated lasers or LEDs and grouping them based on emitted frequency). While this may tend to shift the color primaries toward the neutral point away from the spectral locus, and thus may cause a reduction in the color gamut, the technique allows for a careful tradeoff between color gamut and stability under individual metamerism variability.

Second Embodiment- Direct View Displays Systems

The same principal can be applied to LED backlit LCD displays and OLED displays where LEDs can be selected (e.g. from production bins) to generate a wider primary spectrum. In this case, LEDs on the backlight would have the wavelength bin taken into account during placement to ensure geographic areas were not devoid of certain wavelengths. In a direct view OLED application, the primaries of each triplet pixel would be consistently varied across the screen such that when multiple pixels display a color a wider spectrum would be guaranteed.

Figure 4A:
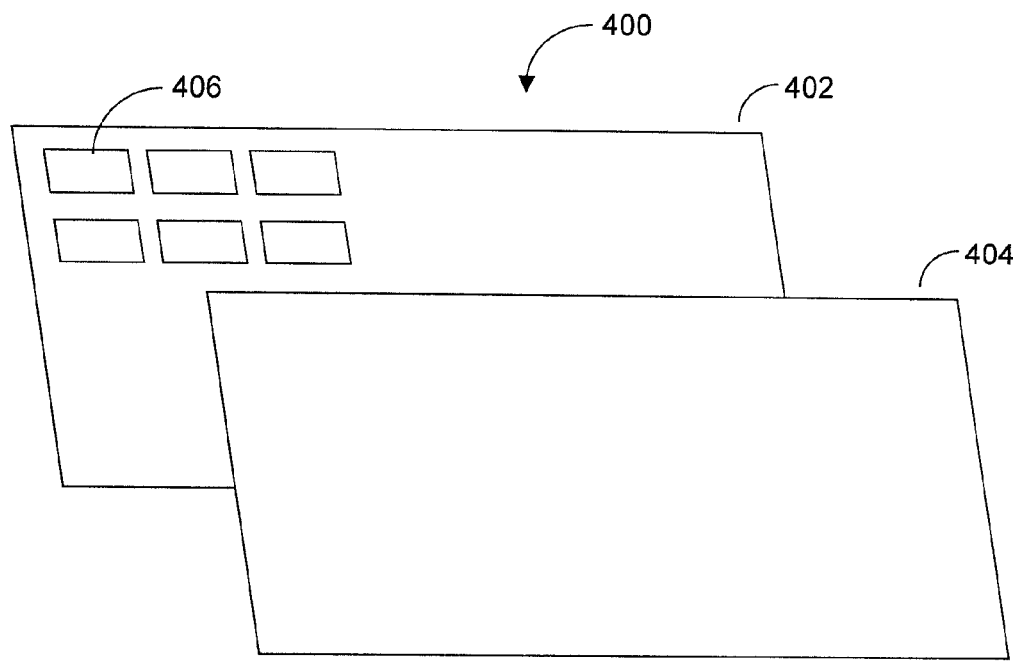
FIG. 4A shows one embodiment of a direct view display system comprising a narrowband emitting backplane and a diffuser.

For another embodiment, FIG. 4A depicts a simplified view of an LCD direct view display 400. Display 400 may be broadly construed as having a LED backplane 402, further comprised of LEDs—either individually placed or in packages, such as package 406. In addition to the LED backplane 402, newer LCD displays that effect a local dimming feature may further comprises diffuser 404 in order to create a better blending of colors and avoid "hot spots" of illumination, visible through a liquid crystal layer (not shown).

Figure 4B:
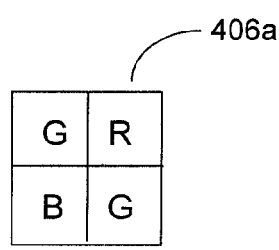
FIGS. 4B and 4C shows two embodiments of a package of narrowband emitters that might comprise the illumination backplane of a direct view display system.
Figure 4C:
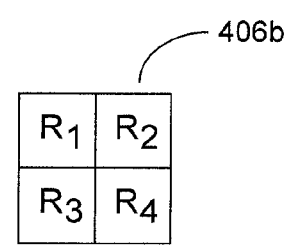

FIG. 4B shows one embodiment of LED package 406a—in this case, one constructed of two green emitters, one red and one blue emitter. If these packages are sufficiently densely populated throughout the backplane 402, then effective distribution of a plurality of individually chosen emitters may provide a modicum of protection against metameric failure as described above. In yet another embodiment, FIG. 4C shows one package 406b in which the plurality of narrowband emitters is placed within a package 406b—e.g. R1, R2, R3 and R4.

Figure 5A:
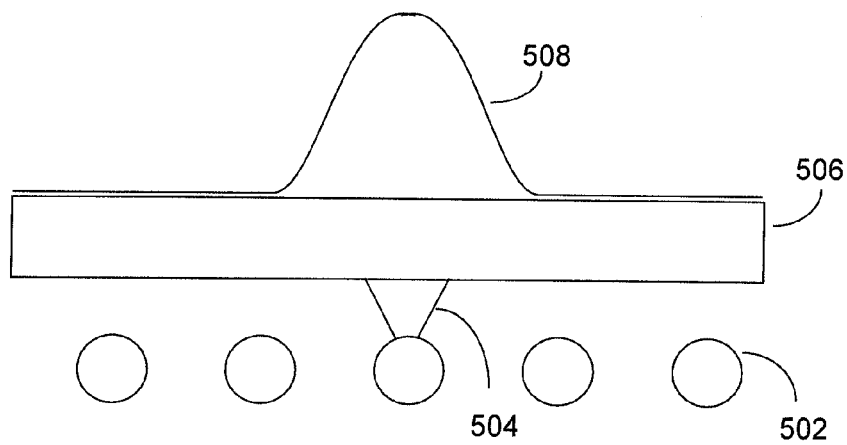
FIGS. 5A and 5B shows two embodiments of transmitted light emitted by narrowband emitters from a backplane to a liquid crystal array.

FIG. 5A shows in better detail in interaction of LEDs 502, then light 506 emitted by one such LED 502, diffuser 506—and the resulting point spread function (PSF) that subsequently illuminates a group of LCD subpixels spatially located to receive the illumination (not shown).

Figure 5B:
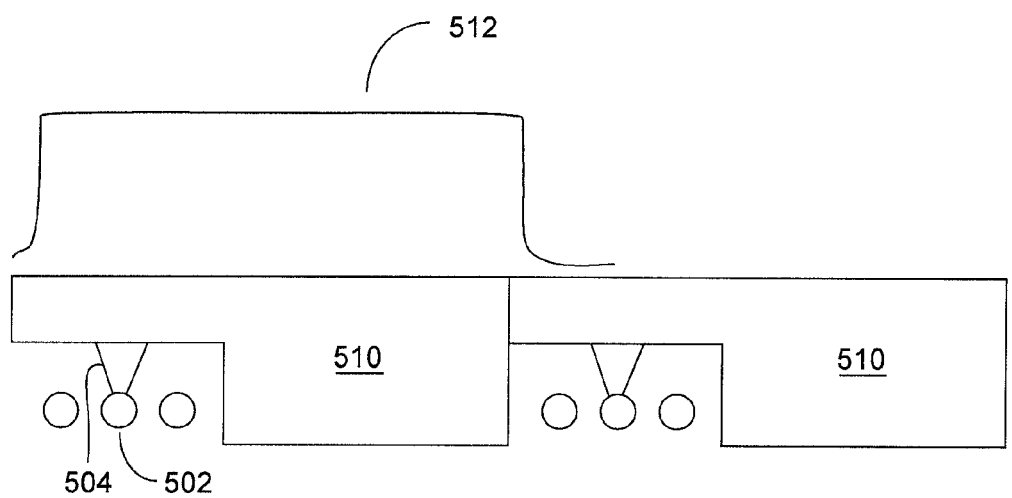

Yet another known manner of providing illumination to spatially located subpixels is shown in FIG. 5B. A group of LEDs (or other narrowband emitters) 502 are grouped to one side of a tile waveguide 510. As illumination 504 from one of the emitters 502 couples with the tile waveguide 510, the resultant illumination 512 is shown. As may be seen, illumination 512 is more evenly and regularly distributed spatially to local LCD subpixels (not shown) than the PSF given by a diffuser. Even in this situation, one embodiment of a display system may comprise a plurality of narrowband emitters, intentionally and evenly distributed in its spectral power curve, for the reasons herein discussed.

Figure 6:
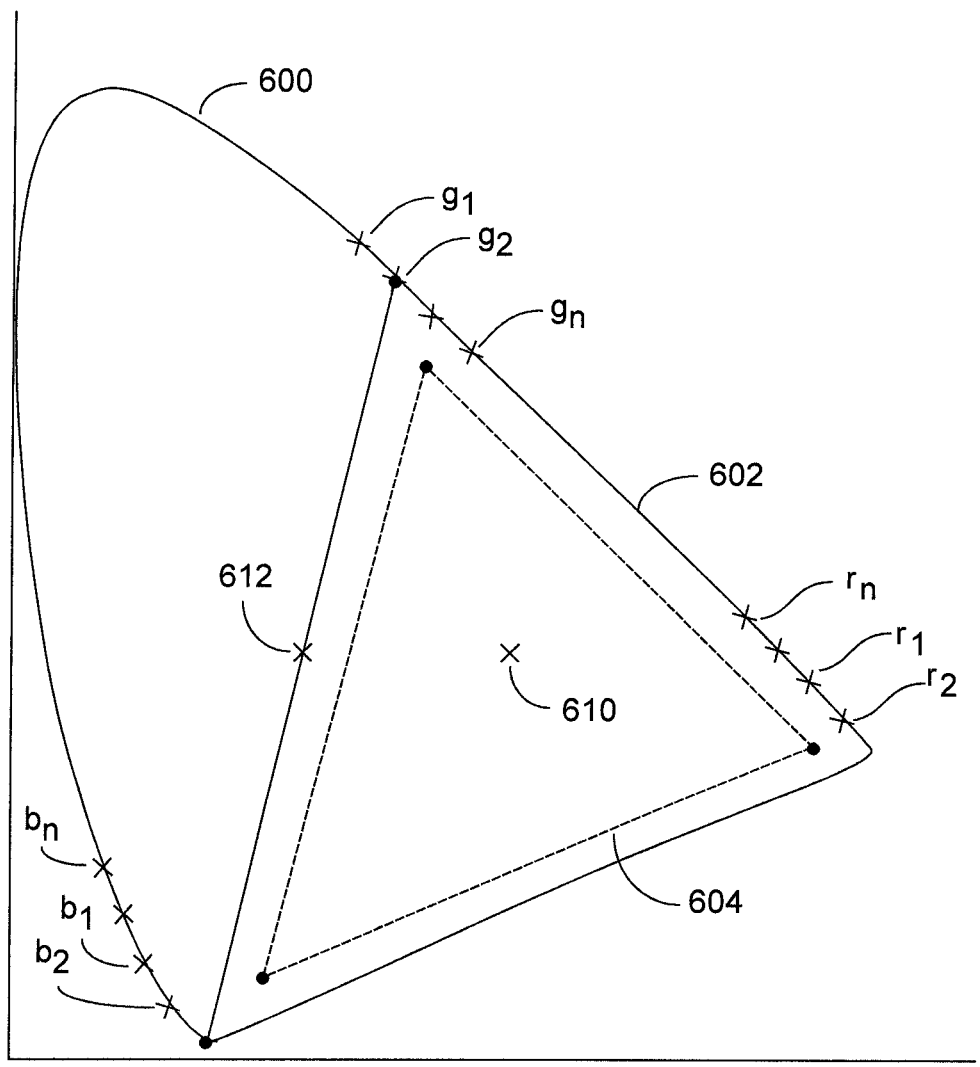
FIG. 6 shows one embodiment of color gamut of a display system inside of the conventional CIE chromaticity chart.

FIG. 6 depicts the standard CIE chromaticity chart 600 and an assumed color gamut 602 of a display system as described herein. As is shown in this one embodiment, each primary color, R, G, B uses a plurality of narrowband emitters (e.g. $r_1, r_2 \ldots r_n, g_1, g_2 \ldots g_n, b_1, b_2 \ldots b_n$) at the corners of the color gamut. If all of the narrowband emitters were turned on, the color gamut would be smaller—as shown, for example, as gamut 604. As the display system is in operation and rendering color images, most image values will have their chromaticity points somewhere comfortably within the color gamut of the display, such as point 610. When rendering such point 610, the system may use the illumination of the plurality of narrowband emitters to the effect as described herein. It should be appreciated that the emitter frequencies are not necessarily drawn to scale on FIG. 6—for example, the emitter frequencies might be grouped in manner a much tighter around a primary value than shown. In addition, the placement of the narrowband emitters may be different than what is shown in FIG. 6—for merely one example, the green emitters may be placed closer to the top of the CIE chart.

However, as the display system detects that an image value (e.g. point 612) is approaching the extremes of the color gamut of the display (or perhaps even out of gamut), it may be desirable that the display system use only one (or a small number) of narrowband emitters to illuminate that image value. For example, to create image value 612, it may be desirable to employ only one green emitter (say, $g_j$, for some j) and one blue emitter (say, $b_i$, for some i) to render the color value of point 612, which may be a deep cyan value.

Embodiment For Driving Narrowband Emitters

For the embodiments above, it suffices that there is a set of intentionally selected narrowband emitters for at least one primary of the display system. The display system can drive these narrowband emitters in any manner known in the art. However, given the design of these embodiments, there may be an opportunity to drive these narrowband emitters advantageously, depending upon the image data to be rendered by the display system.

Figure 7:
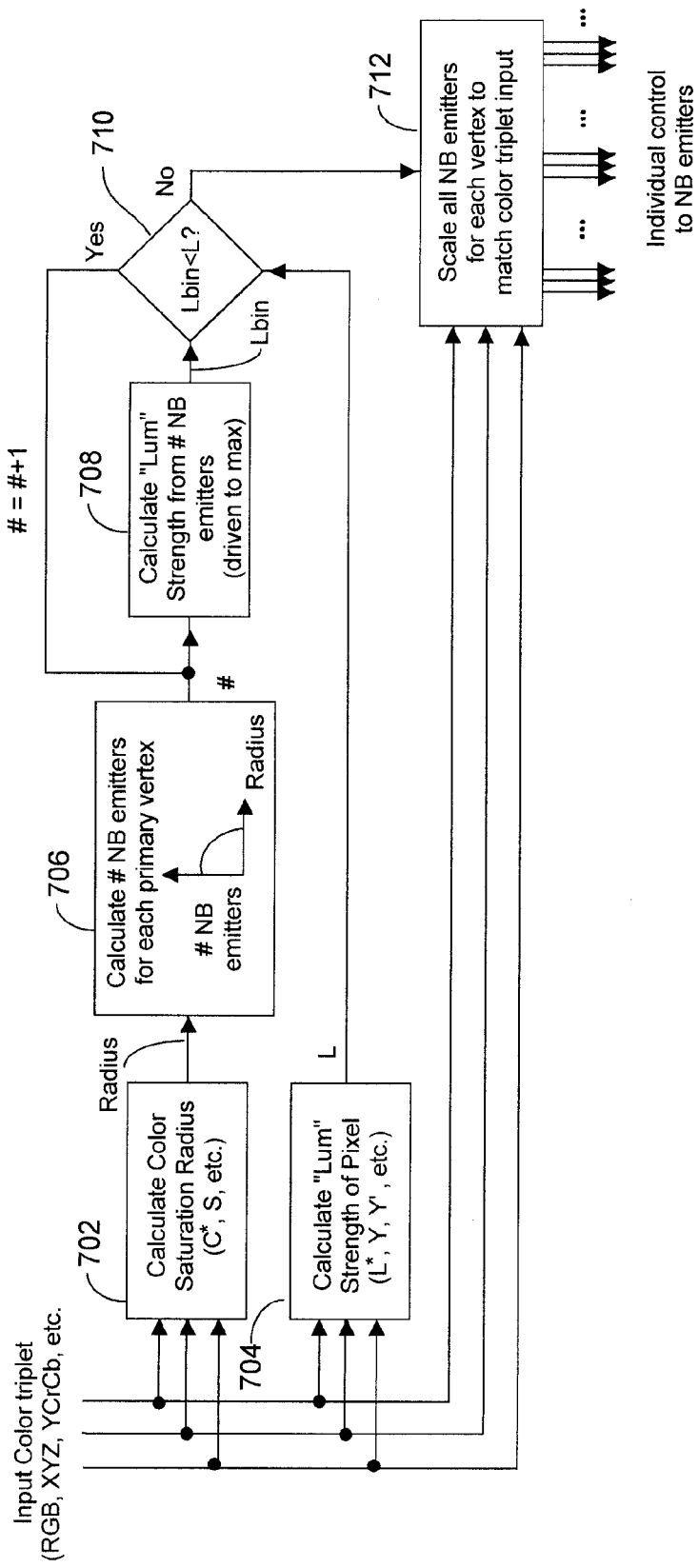
FIG. 7 shows a block diagram of one embodiment of a system for driving narrowband emitters.

FIG. 7 shows a block diagram of one embodiment of a driver for at least one plurality of narrowband emitter in a display system.

Driver inputs image data—here shown as an input color triplet (e.g. RGB, XYZ, YCrCb or the like)—however, it should be appreciated that the techniques and system can be expanded to drive a multiprimary system of any number of different primary colors desired. Driver may calculate the color saturation radius at 702 and luminance of the image data at 704. Once the color saturation radius of the image data is determined and/or derived, the driver may calculate the number of narrowband emitters that may suffice for each primary color (at least those having the intentionally selected emitters) at 706. For each NB emitter, a luminance value may be known—and as the luminance is additive for multiple emitters, the luminance of the emitters are compared or measured against the luminance derived, calculated or otherwise dictated by the image data at 710. If the luminance of the lit emitters is not enough for the luminance of the image data, then other emitters may be turned on. As these emitters are turned on, they may be driven to their max luminance—or any other luminance value desired; but in at least one embodiment, the max luminance may be tried initially for lit emitters at 708.

In operation, however, driver could proceed as follows: as the overall primary needed to be raised for brighter input primary values, more and more of the binned primaries would be added (per the needs of each primary vertex) to reach the needed light level. However, driver may proceed differently if metamerism problems may be present.

For merely one example, metamerism problems may arise when the primary values are low (e.g. darks and neutral values). In such a case, it may be desired that, as the chroma (e.g. color saturation radius) increases, driver may reduce the number of narrowband emitters used, even though this may run counter to the desire to turn on more emitters to achieve a higher primary luminance value—e.g. whichever one is closest to the color needing high saturation.

However, to keep the color from being desaturated due to the spreading of spectral width of the primary, driver may turn on less narrowband emitters. Thus, in one embodiment, driver may drive a set of chosen emitters stronger. The driver may determine the chroma (color saturation radius) of the image data. Then, the driver may determine the number of narrowband emitters to turn on for that saturation (e.g. for more color saturation, perhaps use less narrowband emitters). But then the driver may check to see if a set of emitters can meet the desired luminance of the image data. If not, the driver may add more narrowband emitters (i.e., at or around the same primary vertex position). For non-saturated colors, especially white, it may be desired to turn on more emitters (at a lower amplitude if needed) in order to reduce metamerism variability.

If the driver determines that there is sufficient luminance due to the selected narrowband emitters, the driver may then scale the overall values down of all narrowband emitters per vertex (and this may be done for all in the primary vertex; i.e. the R primaries for example) to get the input color at 712.

Figure 8A:
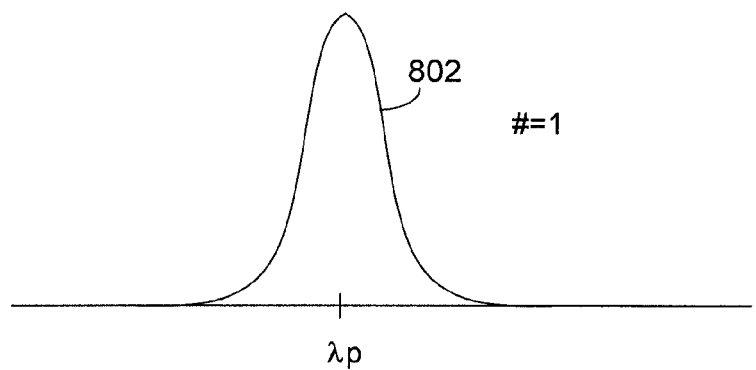
FIGS. 8A-8C show one embodiment of selectively turning on narrowband emitters.
Figure 8B:
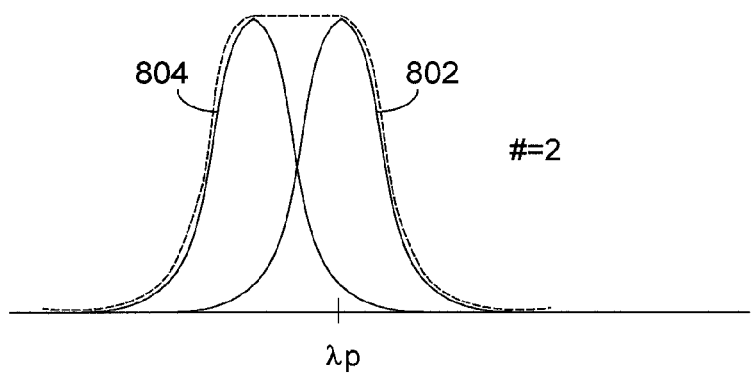
Figure 8C:
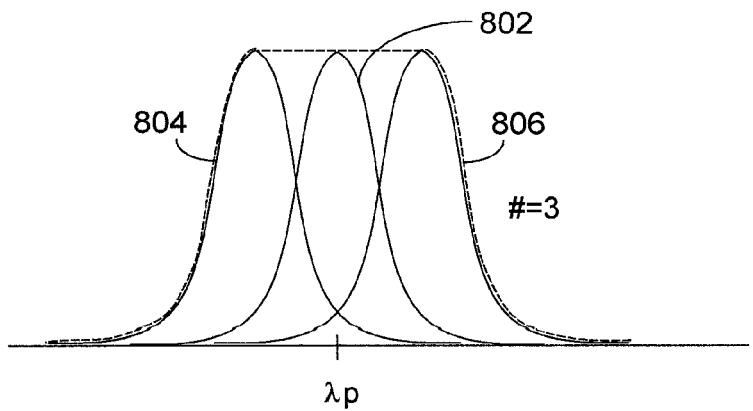

In another embodiment of a driver, FIGS. 8A through 8C depict one embodiment of a desired manner to turn on narrowband emitters to achieve satisfactory luminance and saturation. In FIG. 8A, one desired narrowband emitter is turn on (for example, 802). This desired emitter may be, for example, the one closest to the primary color specified for the display. Alternatively, the desired emitter could be the one closest to the chromaticity of the image data. If more emitters are desired and/or needed for, e.g. luminance, then FIG. 8B and 8C show that a second and then a third emitter may be turned on that are perhaps second and third closest to the specified primary color, respectively 804 and 806. This process may continue until satisfactory luminance for the image data is realized.

A detailed description of one or more embodiments of the invention, read along with accompanying figures, that illustrate the principles of the invention has now been given. It is to be appreciated that the invention is described in connection with such embodiments, but the invention is not limited to any embodiment. The scope of the invention is limited only by the claims and the invention encompasses numerous alternatives, modifications and equivalents. Numerous specific details have been set forth in this description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

The invention claimed is:

1. A method for driving a display system, said display system comprising at least one plurality of narrowband emitters, said at least one plurality of narrowband emitters emitting lights selected in frequency substantially near a first primary color such that said at least one plurality of narrowband emitters emit a substantially even power distribution in a desired band when said at least plurality of narrowband emitters are turned on, the steps of said method for driving a display system comprising:
   inputting image data;
   calculating input image data color saturation values;
   calculating input image luminance values; and
   selectively determining which narrowband emitters to turn on, depending upon the calculated saturation and luminance values of the input image data;
   wherein said step of selectively determining which narrowband emitters to turn on further comprises:
   selecting an initial set of narrowband emitters to turn on to an initial luminance value, depending upon the color saturation of the input image data;
   comparing the luminance of said initial set of narrowband emitters to the luminance value of the input image data;
   driving the initial set of narrowband emitters to a luminance value higher than the initial luminance value, if the sum of the initial luminance value of the initial set of narrowband emitters is lower than the luminance value of the input image data.

2. The method as recited in claim 1 wherein said method further comprises the step of:
   turning on at least one additional narrowband emitter, if the total luminance of the initial set of narrowband emitters at maximum luminance is lower than the luminance value of the input image data.

3. A method for driving a display system, said display system comprising at least one plurality of narrowband emitters, said at least one plurality of narrowband emitters emitting lights selected in frequency substantially near a first primary color such that said at least one plurality of narrowband emitters emit a substantially even power distribution in a desired band when said at least plurality of narrowband emitters are turned on, the steps of said method for driving a display system comprising:
   inputting image data;
   calculating input image data color saturation values;
   calculating input image luminance values; and
   selectively determining which narrowband emitters to turn on, depending upon the calculated saturation and luminance values of the input image data;
   wherein said method further comprises the step of:
   selectively decreasing the number of narrowband emitters if the color saturation of the input image data increases.

4. A method of selectively turning on emitters in a display system, said display system further comprising at least one plurality of narrowband emitters, said at least one plurality of narrowband emitters emitting lights selected in frequency substantially near a first primary color such that said at least one plurality of narrowband emitters emit a substantially even power distribution in a desired band when said at least plurality of narrowband emitters are turned on, the steps of said method for driving a display system comprising:
   (a) turning on a first narrowband emitter, said first narrowband emitter being substantially closest in frequency to said first desired color;

(b) If maximum luminance of said first narrowband emitter is lower than the luminance of the input image data, turning on a next narrowband emitters, said next narrowband emitter being substantially the next closest in frequency to said first desired color; and (c) Repeating step (b) until the maximum luminance of said narrowband emitters is substantially equal to the luminance of the input image data.

5. The method as recited in claim 4 wherein said first desired color is the primary color of said display system.

6. The method as recited in claim 4 wherein said first desired color is a primary color comprising the chromaticity of the input image data.

7. A laser projection display system comprising:
a set of narrowband emitters, said set of narrowband emitters capable of producing illumination for said display system to produce displayed images;
said set of narrowband emitters further comprising at least one plurality of narrowband emitters, said at least one plurality of narrowband emitters emitting lights selected in frequency substantially near a first primary color;
a set of wavelength tuners, said wavelength tuners optically coupled to receive light from said at least one plurality of narrowband emitters; and
a controller coupled to said set of wavelength tuners, said controllers sending control signals to said set of wavelength tuners to modulate the frequency of the light emitted by said at least one plurality of narrowband emitters.

8. The laser projection display system as recited in claim 7, further comprising:
an integrating sphere, said integrating sphere inputting light from said set of narrowband emitters.

9. The laser projection display system as recited in claim 8 wherein said laser projection display system comprises a direct view display.

10. The laser projection display system as recited in claim 9 wherein said direct view display further comprises:
a plurality of narrowband LED emitters; and
a diffuser.

11. The laser projection display system as recited in claim 9 wherein said direct view display further comprises:
a plurality of narrowband LED emitters; and
a plurality of tile waveguides.

12. The laser projection display system according to claim 7,
wherein said at least one plurality of narrowband emitters emit a substantially even power distribution in a desired band when said at least plurality of narrowband emitters are turned on.

13. The laser projection display system as recited in claim 12 wherein said desired band comprises the range of substantially 18 nm to 33 nm.

14. The laser projection display system as recited in claim 7 wherein said laser projection display system is one of a group, said group comprising: a laser projector and a LED direct view display.

15. The laser projection display system according to claim 7, wherein said controller configured to set a brightness of the narrowband emitters dependent upon calculated saturation and luminance values of an input image data.

16. The laser projection display system as recited in claim 7 wherein said set of wavelength tuners is paired with said plurality of narrowband emitters on a one-to-one basis.

17. The laser projector display system as recited in claim 16 wherein said wavelength tuner comprises one of a group, said group comprising: LC cavity, optical parametric oscillator, piezoelectric crystal oscillator, non-linear crystal and dye-tunable laser.

18. The laser projection display system as recited in claim 16 wherein said controller sends control signals to separately modulate the frequency of each of said plurality of narrowband emitters.

19. The laser projection display system as recited in claim 18 wherein said controller sends control signals to modulate the frequency of each of said plurality of narrowband emitters such that the frequencies of said plurality of narrowband emitters are grouped closer together, if the image data to be rendered comprises substantially little or no desaturated content.

20. The laser projection display system as recited in claim 18 wherein said controller sends control signals to modulate the frequency of each of said plurality of narrowband emitters such that the frequencies of said plurality of narrowband emitters are grouped further apart, if the image data to be rendered comprises substantially little or no saturated content.

* * * * *